June 30, 1936.  A. P. ARMINGTON  2,046,299
CRAWLER WHEEL LINK
Filed Aug. 31, 1934   3 Sheets-Sheet 1

INVENTOR
ARTHUR P. ARMINGTON
BY
ATTORNEYS

INVENTOR
ARTHUR P. ARMINGTON
BY
ATTORNEYS

June 30, 1936.    A. P. ARMINGTON    2,046,299
CRAWLER WHEEL LINK
Filed Aug. 31, 1934    3 Sheets-Sheet 3

INVENTOR
ARTHUR P. ARMINGTON
BY
Brockett, Hyde, Higley & Meyer
ATTORNEYS

Patented June 30, 1936

2,046,299

UNITED STATES PATENT OFFICE 2,046,299

CRAWLER WHEEL LINK

Arthur P. Armington, Willoughby, Ohio, assignor to The Euclid Road Machinery Company, Euclid, Ohio, a corporation of Ohio Application August 31, 1934, Serial No. 742,212

6 Claims. (Cl. 305—10)

This invention relates to a link for pneumatic or otherwise resilient tire application in an endless tread linkage of articulated similar links, and is particularly adapted for employment in connection with low and medium pressure, heavy-duty driving tires loaded to be substantially deformed or flattened against the ground, to produce substantial bearing area in the ground-bearing zone. This application is a continuation in part, of my copending application, Serial No. 701,001, filed December 5, 1933.

An object of this invention is to provide a link which will have better cooperation with the tire upon which its linkage is mounted, so that the linkage will have less slippage on the tire and be more effectively self-centering thereupon, although it may be loosely fitting thereabout. Another object is to provide a linkage that contacts with the tire at its thickest tread portions and aside from those receiving the most wear when the tire is used without the linkage, so that the life of the tire will be extended, as will appear.

Other objects are to provide improved load bearing and grouser action with maximum traction and self-leaning effect for the linkage against the ground, also to provide a link of greater strength yet lighter weight than has heretofore been produced.

Figure 1:
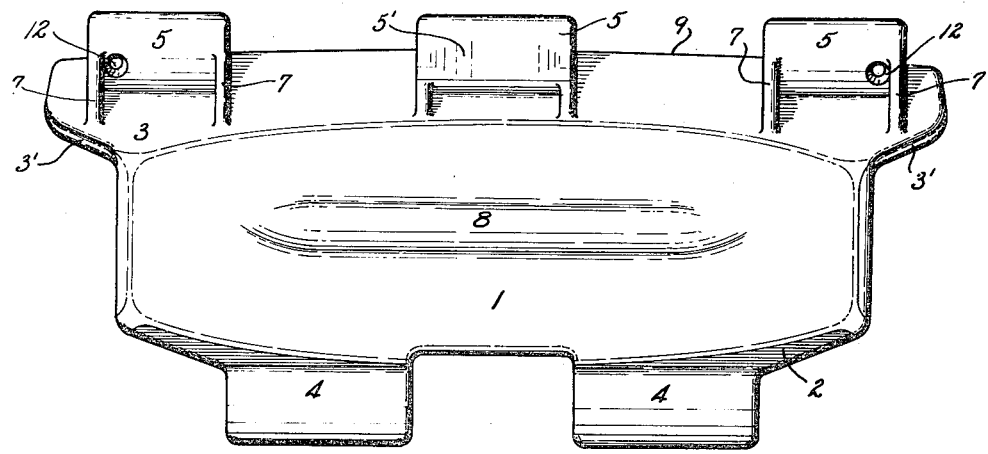
Figure 2:
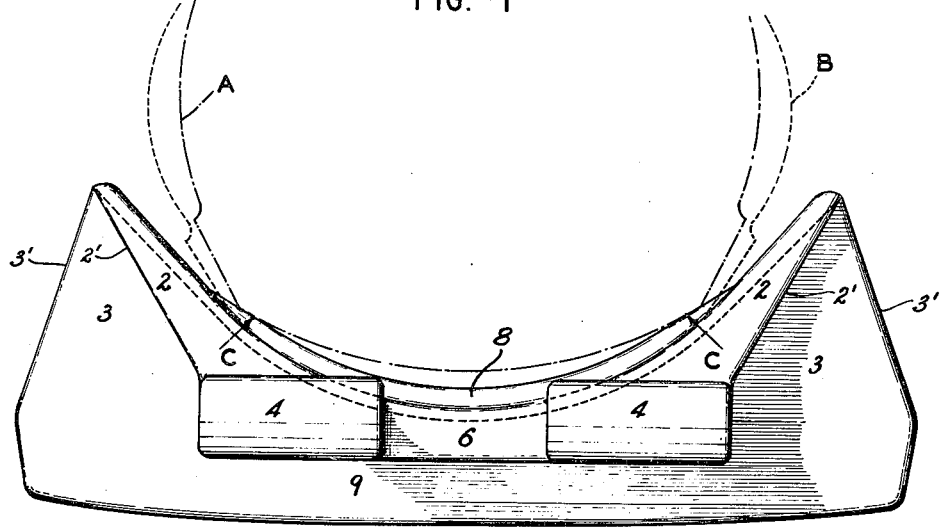
Figure 3:
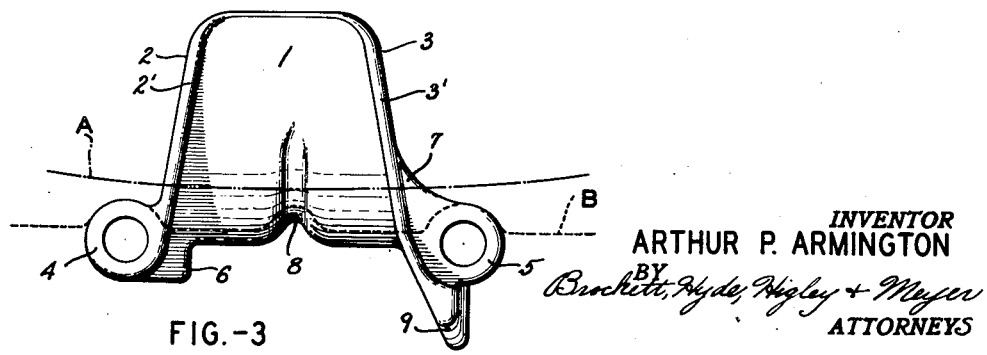
Figure 4:
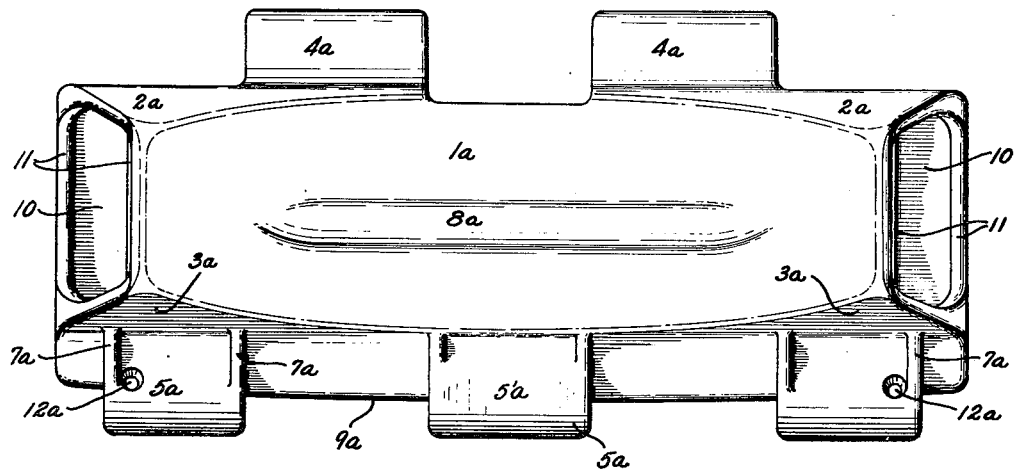
Figure 5:
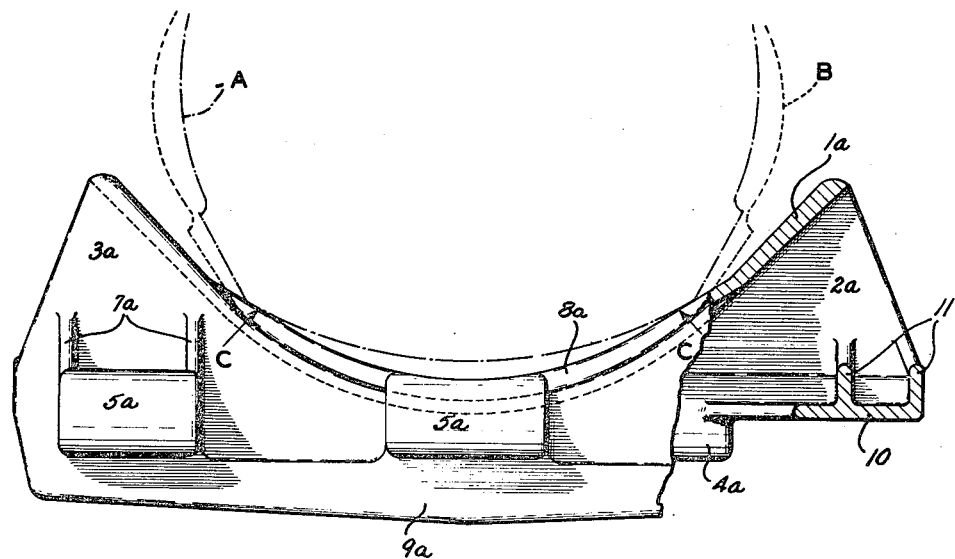
Figure 6:
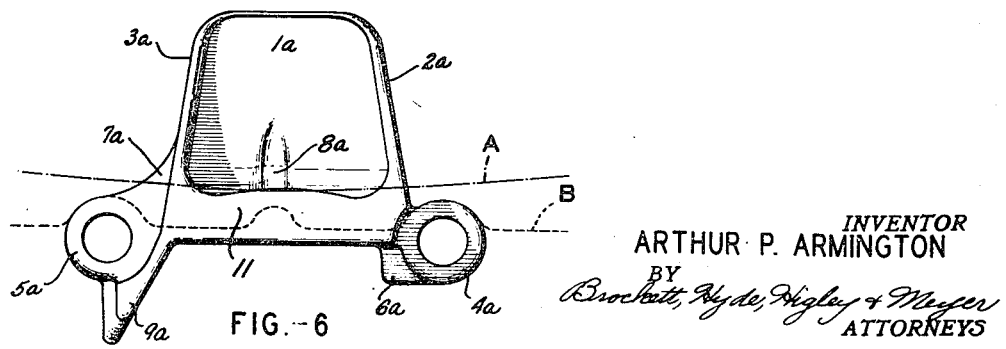
Figure 7:
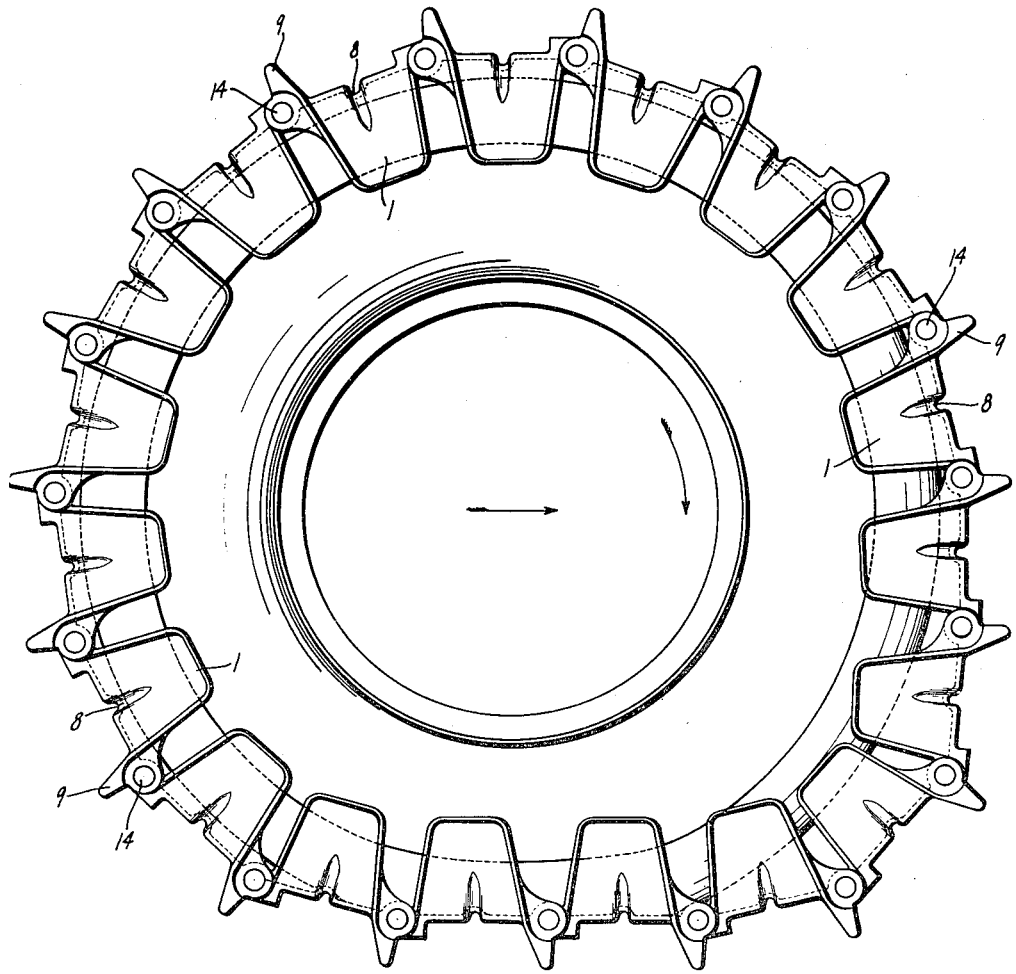
Figure 8:
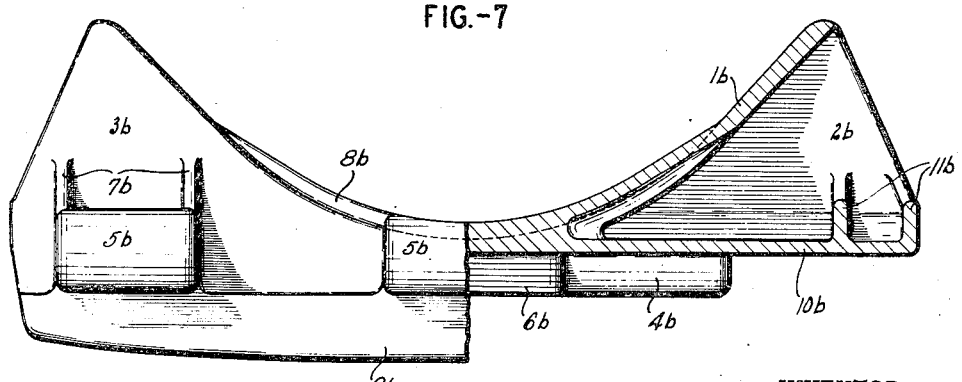

The exact nature of this invention together with further objects and advantages thereof will be apparent from the following description taken in connection with the accompanying drawings, in which Figs. 1, 2 and 3 are respectively plan, end elevation and side elevation of a tread link embodying the invention and disposed as in ground-engaging position, Figs. 2 and 3 indicating in dot-dash lines the relative sectional positions of a co-operative tire when deformed as in the ground-bearing zone, and when undeformed as at the top part of the wheel. Figs. 4, 5 and 6 are views similar to Figs. 1, 2 and 3 respectively, but showing a modified form of link, and Fig. 5 having parts broken away to show details of construction. Fig. 7 is a side elevation illustrating the action of the linkage of the form of Figs. 1, 2 and 3 on a wheel in motion, and Fig. 8 is a view similar to Fig. 5 but showing a modified form of link.

The link, in each of its forms, is substantially wider than its length, and has a main body part which is of substantially uniform thickness throughout, and formed to provide a shape of characteristics to be described.

With reference now first to the link shown in Figs. 1 to 3, this main body has two principal wall parts, an intermediate one 1, and an end wall part 3. The relation between the intermediate and end wall parts, in section longitudinal of the link, is angular, so that the characteristic elevation in longitudinal planes is an inverted L. The intermediate wall part is of much greater width than length, as indicated in Fig. 1, and its developed outline is generally that of an ellipse truncated at its ends and disposed with its major axis transverse of the linkage. The intermediate wall part has a substantially transversely extending curvature, so that its upper face provides a seat for the tire and preferably extends laterally therebeyond, as indicated in Fig. 2. The curvature is of parabolic characteristic, maximum central of the link and diminishing gradually therefrom, its ends preferably approaching straight tangential planes at the sides of the tire. Longitudinally of the link, the intermediate wall part together with its tire seat face, is flat with the exceptions to be noted.

The end wall part 3 extends downwardly and preferably slightly forwardly from the forward laterally extending extremity of the intermediate wall part as shown, Figs. 1 and 3. As will later appear, the link illustrated, as in ground-engaging position, is intended for such relation with its driving tire that its wheel will be rolling from the observer, Fig. 2, clockwise in Fig. 3. The end wall part 3 extends laterally beyond the intermediate wall part 1, as shown Figs. 1 and 2.

Hinge-pin-receiving lugs are provided at the ends of the link, in staggered relation on the opposite ends, and extending therefrom longitudinally of the link. Thus a pair of spaced hinge lugs 4 are provided at the rear end of the link and three lugs 5 are provided at the forward end of the link. It will be noted that the three hinge lugs 5 are located at the forward end of the link associated with the wide end wall part 3, adjacent the lateral extremities of the latter and extending beyond the intermediate wall part 1. The end pair of lugs 5 are thus widely spaced apart from each other, to provide a long hinge connection between the links.

A rear end wall part 2 may extend downwardly from the intermediate wall part 1, as at 6, between the hinge lugs 4 to provide reinforcement therebetween, and webs 7 may be provided to assist in securement of the outermost hinge lugs 5 with the end wall 3.

From Figs. 2 and 3 it will be observed that the hinge lugs 4 and 5 are centered in the plane to which the intermediate wall part 1 is tangent at its lowermost part, and therefore extend both above and below the central, lowermost, part of the intermediate wall, so that the cooperative tire may have bearing upon the intermediate hinge lug 5 and somewhat upon the hinge lugs 4 in the ground-engaging zone. The intermediate wall 1 may preferably have an upstanding rib deformity 8 extending laterally of the link across the curvature of the intermediate wall 1, against which also the tire may have similar bearing, and serving as well to strengthen the intermediate wall 1. The intermediate hinge lug 5 may preferably have a depression 5' in its upper face conforming with the contour of the corresponding central part of the rib 8.

The forward end wall part 3, with which the more widely spaced hinge lugs are associated, while located generally in a plane, extends downwardly beyond its hinge lugs 5, and therebeneath to form a grouser 9 extending laterally of the link, with its edge substantially directly beneath the center line of the hinge lugs 5. This end wall part 3, as already observed, extends laterally beyond the intermediate wall part 1, and preferably terminates laterally with edges 3' sloping downwardly and outwardly thereof, as indicated Fig. 2.

What has thus far been described is common to all three forms of link herein disclosed. These forms have identical cooperative relationship with the tire, in a linkage applied thereto, but differ somewhat from each other in ground-engaging effect.

The form of link shown Figs. 1 to 3 is of general utility, but especially adapted for employment under muddy and sticky soil conditions.

In this form, rear end wall parts 2 extend from the lateral extremities of the intermediate wall part 1, to the corresponding hinge lugs 4, with lateral edges 2' sloping inwardly of the link; these wall parts 2 sloping rearwardly and downwardly from the intermediate wall part, and acting as fillets or webs reinforcing the rearward hinge lugs 4, and cooperating with the end wall part 6 as a unitary rear end wall of much less area than the forward end wall 3.

As usual in the art, the hinge lugs 4 and 5 are provided with the laterally extending openings indicated, to receive the usual hinge pins, the hinge lugs being so spaced that the lugs 5 of one link will receive therebetween the lugs 4 of the next adjacent ones, so that the link may be assembled with similar links to form an articulated endless tread linkage disposed about a pneumatic tire. The outermost hinge lugs 5 may be provided with openings 12 to receive rivets for securing the hinge pins by which the links are joined.

Briefly, as to the relation of link to ground, the grousers 9 are forced into the ground by the weight of the load until the curved under surface of the intermediate wall part 1 bears upon the ground. The greater the weight of the load, the more will the link sink into the ground, the bearing area being extended coincidentally laterally and upwardly of the intermediate wall part 1. The tendency is to force the earth and particularly the earth displaced by the grouser, upwardly and laterally outwardly to increase the bearing of the wall part 1. The rear face of the grouser which produces most of the tractive effect against the ground, assists in packing the earth against the curved under surface of the link by which principally the load is supported. But since this packing of earth is accompanied by its relative motion over the bottom surface areas of the link, tendency of the earth to stick to the link is diminished.

As the link progresses beyond the ground-engaging zone, the relatively narrow rear wall part 2 with its undercut lateral extremities 2', permits ample clearance for egress of earth just previously packed against the under surface of the link, so that the link is substantially self-cleaning in operation even in very sticky earth.

Figs. 4 to 6 inclusive show a form of link adapted for use in rock or soft loose earth, and has thus general utility also. In these figures, parts identical with the corresponding parts appearing in Figs. 1 to 3 bear similar reference characters with the suffix "a".

This form of link differs from that previously described, in the following respects.

The end wall parts 2a and 3a are laterally coextensive, each extending laterally beyond that part of the intermediate wall part 1 upon which the tire bears, and are interconnected at their extremities by webs 10 which may be flanged as at 11. These webs are arranged to present substantial flat areas in ground-engaging direction, located approximately in the plane of the lower extremity of the intermediate wall part 1. For general service conditions it is important also that the webs 10 be located substantially spaced from the intermediate wall part 1a to provide a substantial opening between the webs and the wall part for clearance of earth as will appear.

A linkage of such links is intended to be applied to a tire arranged to roll toward the observer, Fig. 5, counterclockwise Fig. 6.

As to the action between the linkage and the ground, in other than the hardest of surfaces, the load will project the grousers into the ground until the webs 10 have substantial bearing to carry most of the load, the principal function of the grousers being to provide traction.

The clearance openings between the webs 10 and the intermediate wall parts 1a of the links, permit egress for earth thrown up by the grousers if the earth be soft or muddy enough.

While the form just described provides an excellent general purpose link for general operating conditions, if the earth be extremely soft, as of sand, the modification of Fig. 8 is preferred. The link there indicated is identical with the link of Figs. 4 to 6, with the exception that the web 10b extends entirely across the link, between the end wall parts 2b and 3b thereof, and joined with the intermediate wall part 1b at the center as indicated. This form of link therefore presents a much greater flat bearing area to the ground, but otherwise functions in the same manner as the form just previously described.

Operation in general as to each form of link will be as follows.

In employement, the endless tread linkage is usually disposed somewhat loosely upon its tire, so as to permit a slack zone in the linkage just ahead of the ground-engaging zone, whereby each link may rest substantially flat upon the ground in load-carrying position before the tire rolls upon it. The end walls 2 and 3 of each link, have such angularity therebetween, and are so related with the hinge lugs, that the links themselves may have sufficient angularity in the slack zone for the purpose. The links are sufficiently short that two or more may simultaneously rest flat upon the ground in the ground-bearing zone to define a straight trough in which the tire bears to carry its load. This trough is substantially uninterrupted and smooth with the exception of the projections of the central hinge lugs 5 and the ribs 8.

Fig. 7 shows the linkage, in the form of Figs. 1 and 3, as applied to the tire of a driving wheel rolling to the right in the figure as indicated by the arrows. The linkage is not tight upon the tire, so that the links may assume the relative positions indicated. Throughout most of the periphery, the links will simply bear against the tire tread with bearing characteristics to be described. In the ground-bearing zone beneath the tire, two or more of the links will be disposed to define the described substantially uninterrupted trough straight in the longitudinal direction and curved in the transverse direction, into which trough the tire will be expanded by its load. The relation of the pitch of the linkage with the radius and inflation of the tire is such that at least two links will always bear substantially flat upon the ground.

Immediately ahead of the ground-bearing zone, the slack in the linkage will tend to accumulate, so as to permit each link to assume ground-engaging position before the tire rolls upon it. Each link as it progresses from the slack zone to the ground engaging zone, swings forwardly and downwardly about its rearward hinge connection, so that its grouser enters the ground with a hooking action.

In this slack zone, adjacent links have the greatest angularity about their hinge pins 14 by which they are connected. The end wall parts 2 and 3 of the body parts of the links have been noted as, for this purpose, so disposed and particularly as so angularly related as to permit substantially greater angularity between links than is necessary for their fitting about the tire as in the idle zone.

As will be observed from Figs. 2, 3 and 5, the cooperative tire when undeformed, as in the idle zone or elsewhere than in the ground-engaging or slack zones, as indicated at A in Figs. 3 and 6, will not have bearing against the link in the common central longitudinal plane, but as indicated at A in Figs. 2 and 5, will have bearing against the main face part of the intermediate wall part only at points laterally removed from the central plane. When the tire is deformed under load, however, as in the ground-bearing zone, the tire will mould itself to conform with its seat on the link as indicated at B, Figs. 2, 3, 5 and 6. It will be apparent that as the tire assumes the position of the lines B, from that of the lines A, it will have a wedging effect, firmly centering it in the link against lateral relative displacement, and also much improving the tractive effect between link and tire. Generally, the greater the tire deformation or the larger the tire size, the higher up will the tire bear upon the straighter side parts of the face of the intermediate wall of the link, so that the link is practically self-accommodating to the tire as to inflation and size.

While the term "idle zone" has been applied to that principal peripheral part which does not include either the ground-bearing zone or the slack zone, it will be understood that the links bear against the tire throughout this idle zone, with some wedging effect of tire into link and consequently with tractive effect between tire and linkage cumulative through the idle zone. The term "idle zone" has been applied to this zone merely for convenience.

The maximum bearing between tire and link will thus be generally at laterally spaced locations, as indicated by the arrows C, Figs. 2 and 5.

The tire having the usual extra thickness of rubber at its tread, and its tread being somewhat flattened, the action just described will result in substantial equalization of the wear of the tread rubber. In actual service the linkage is applied to the tire only when conditions of soft going require the added traction of the linkage, otherwise the linkage is removed and the tire run directly upon the ground. When the tire is run directly upon the ground, its tread will have the most wear in its central plane, with less wear at the edge parts of the thickened tread rubber. When the linkage is employed, however, the tire will have the most wear at the edges of the thickened tread part rather than in the center.

While the described wedging action, between tire and links, and effective entirely about the tire with the exception of the slack zone, provides amply sufficient traction between these parts under all ordinary operating conditions, yet under extremely slippery conditions in wet clay or the like, where the earth acts as a lubricant, the grip of the linkage upon the tire may be still further improved by shortening of the linkage to tighten it against the tire entirely about the latter. This may be accomplished as by removing one of the links, and thereafter deflating the tire, placing the shortened linkage thereabout and inflating the tire into the linkage. Inflation of the tire then provides a wedging effect between tire and linkage entirely about the tire, yet still permits the linkage to flatten, with the tire, in the ground-bearing zone generally as already described.

What I claim is:

1. A tread link for pneumatic tire application in an endless tread linkage of articulated similar links, said link comprising a body, including an intermediate wall part of substantially greater width than length in the linkage and being transversely curved to provide a seat for a tire, and a longitudinally spaced transversely disposed pair of end wall parts extending divergently downwardly from the forward and rearward extremities of said intermediate wall part, hinge lugs at the ends of the link and secured to said end wall parts to provide hinged relation with similar links, said hinge lugs including a pair of lugs laterally spaced at the forward end of the link to extend laterally beyond that part of said tire seat normally bearing against said tire, the corresponding forward end wall part extending downwardly beyond said hinge lugs and thereneath to form a grouser, and said hinge lugs including, at the rearward end of the link, hinge lug means located to be disposed between the forward hinge lug means of an adjacent similar link in a linkage, said rearward end wall part having its lateral terminating edges extending between said rearward hinge lug means and the lateral extremities of said intermediate wall part, whereby, said link being in ground-engaging position in said linkage, said intermediate wall part will provide load-carrying bearing against the ground, the softer the ground the wider the bearing, said grouser will provide traction and assist in increasing said bearing by displacing earth against said intermediate wall part, and said earth will have free egress subsequently, laterally of the link, and rearwardly of the side portions of said intermediate part.

2. A tread link for resilient tire application in an endless tread linkage of articulated similar links, said link comprising a body, including an intermediate wall part of substantially greater width than length in the linkage and transversely curved to provide a seat for a tire, and a longitudinally spaced transversely disposed pair of end wall parts extending divergently downwardly from the forward and rearward extremities of said intermediate wall part, and web means interconnecting said end wall parts and disposed substantially in a plane to which said curvature is tangent.

3. A tread link for pneumatic tire application in an endless tread linkage of articulated similar links, said link comprising a body, including an intermediate wall part of substantially greater width than length in the linkage and transversely curved to provide a seat for a tire, and a longitudinally spaced transversely disposed pair of end wall parts extending divergently downwardly from the forward and rearward extremities of said intermediate wall part, and web means interconnecting said end wall parts and located laterally spaced from said intermediate wall part to provide clearance from the latter.

4. A tread link for pneumatic tire application in an endless tread linkage of articulated similar links, said link comprising a body, including an intermediate wall part of substantially greater width than length in the linkage and transversely curved to provide a seat for a tire, and a longitudinally spaced transversely disposed pair of end wall parts extending divergently downwardly from the forward and rearward extremities of said intermediate wall part, and web means interconnecting said end wall parts and located laterally spaced from said intermediate wall part in a plane to which said curvature is tangent.

5. A tread link for pneumatic tire application in an endless tread linkage of articulated similar links, said link comprising a body including an intermediate wall part of substantially greater width than length in the linkage and transversely curved to provide a seat for a tire, and a longitudinally spaced, transversely disposed, pair of end wall parts extending divergently downwardly from the the forward and rearward extremities of said intermediate wall part, said intermediate wall part having rib means transversely extending across the central part of said curvature intermediate said end wall parts, and hinge means secured to said end wall parts and providing for hinged relation with similar links about axes substantially tangent to said curvature, and including a hinge lug having a portion projecting inwardly into the trough defined by said intermediate wall part substantially coextensively with said rib means.

6. A tread link for pneumatic tire application in an endless tread linkage of articulated similar links, said link comprising a body, including an intermediate wall part of substantially greater width than length in the linkage and transversely curved to provide a seat for a tire, and a longitudinally spaced transversely disposed pair of end wall parts extending divergently downwardly from the forward and rearward extremities of said intermediate wall part, and web means interconnecting said end wall parts at points lateral of that part of said tire seat normally bearing against said tire, and arranged to there present ground-bearing surfaces.

ARTHUR P. ARMINGTON.